United States Patent
Wallach et al.

(10) Patent No.: US 11,106,592 B2
(45) Date of Patent: *Aug. 31, 2021

(54) MICROPROCESSOR ARCHITECTURE HAVING ALTERNATIVE MEMORY ACCESS PATHS

(71) Applicant: Micron Technology, Inc., Boise, ID (US)

(72) Inventors: Steven J. Wallach, Dallas, TX (US); Tony M. Brewer, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 697 days.

This patent is subject to a terminal disclaimer.

(21) Appl. No.: 15/596,649

(22) Filed: May 16, 2017

(65) Prior Publication Data

US 2017/0249253 A1 Aug. 31, 2017

Related U.S. Application Data

(63) Continuation of application No. 11/969,792, filed on Jan. 4, 2008, now Pat. No. 9,710,384.

(51) Int. Cl.
*G06F 12/0888* (2016.01)
*G06F 12/1027* (2016.01)
(Continued)

(52) U.S. Cl.
CPC ...... *G06F 12/0888* (2013.01); *G06F 12/0844* (2013.01); *G06F 12/0877* (2013.01);
(Continued)

(58) Field of Classification Search
CPC ............ G06F 12/0888; G06F 12/0877; G06F 12/1027; G06F 2212/60; G06F 2212/68
(Continued)

(56) References Cited

U.S. PATENT DOCUMENTS

| 3,434,114 A | 3/1969 | Arulpragasam et al. |
| 4,128,880 A | 12/1978 | Cray, Jr. |

(Continued)

FOREIGN PATENT DOCUMENTS

| EP | 0945788 A2 | 9/1999 |
| EP | 1 306 751 | 5/2003 |
| WO | WO-2008/014494 | 1/2008 |

OTHER PUBLICATIONS

Keswani, R., "Computational Model for Re-entrant Multiple Hardware Threads," Electronics and Communication Engineering, Osmania University, Hyderabad, India, 2002, 88 pages.
(Continued)

*Primary Examiner* — Sheng Jen Tsai
(74) *Attorney, Agent, or Firm* — Norton Rose Fulbright US LLP

(57) ABSTRACT

The present invention is directed to a system and method which employ two memory access paths: 1) a cache-access path in which block data is fetched from main memory for loading to a cache, and 2) a direct-access path in which individually-addressed data is fetched from main memory. The system may comprise one or more processor cores that utilize the cache-access path for accessing data. The system may further comprise at least one heterogeneous functional unit that is operable to utilize the direct-access path for accessing data. In certain embodiments, the one or more processor cores, cache, and the at least one heterogeneous functional unit may be included on a common semiconductor die (e.g., as part of an integrated circuit). Embodiments of the present invention enable improved system performance by selectively employing the cache-access path for certain instructions while selectively employing the direct-access path for other instructions.

20 Claims, 4 Drawing Sheets

(51) Int. Cl.
*G06F 12/0844* (2016.01)
*G06F 12/0877* (2016.01)

(52) U.S. Cl.
CPC ...... *G06F 12/1027* (2013.01); *G06F 2212/60* (2013.01); *G06F 2212/68* (2013.01)

(58) Field of Classification Search
USPC .......................................................... 711/131
See application file for complete search history.

(56) References Cited

U.S. PATENT DOCUMENTS

| | | | |
|---|---|---|---|
| 4,386,399 A * | 5/1983 | Rasala | G06F 9/26 710/307 |
| 4,504,902 A * | 3/1985 | Gallaher | G06F 12/0835 711/113 |
| 4,669,043 A * | 5/1987 | Kaplinsky | G06F 12/1063 711/108 |
| 4,685,076 A | 8/1987 | Yoshida et al. | |
| 4,817,140 A | 3/1989 | Chandra et al. | |
| 4,888,679 A * | 12/1989 | Fossum | G06F 9/383 711/E12.003 |
| 4,897,783 A * | 1/1990 | Nay | G06F 12/0862 711/144 |
| 5,027,272 A | 6/1991 | Samuels | |
| 5,097,437 A * | 3/1992 | Larson | G06F 1/10 703/25 |
| 5,109,499 A | 4/1992 | Inagami et al. | |
| 5,117,487 A | 5/1992 | Nagata | |
| 5,202,969 A * | 4/1993 | Sato | G06F 12/0804 711/143 |
| 5,222,224 A * | 6/1993 | Flynn | G06F 12/0822 711/120 |
| 5,283,886 A * | 2/1994 | Nishii | G06F 12/0833 711/121 |
| 5,357,521 A * | 10/1994 | Cheng | G11C 29/02 714/720 |
| 5,513,366 A | 4/1996 | Agarwal et al. | |
| 5,598,546 A | 1/1997 | Blomgren | |
| 5,664,136 A | 9/1997 | Witt et al. | |
| 5,752,035 A | 5/1998 | Trimberger | |
| 5,838,946 A * | 11/1998 | Petolino, Jr. | G06F 12/0888 711/134 |
| 5,838,984 A | 11/1998 | Nguyen et al. | |
| 5,887,182 A | 3/1999 | Kinoshita | |
| 5,887,183 A | 3/1999 | Agarwal et al. | |
| 5,920,721 A | 7/1999 | Hunter et al. | |
| 5,933,627 A | 8/1999 | Parady | |
| 5,935,204 A * | 8/1999 | Shimizu | G06F 12/0804 709/212 |
| 5,937,192 A | 8/1999 | Martin | |
| 5,941,938 A | 8/1999 | Thayer | |
| 5,999,734 A | 12/1999 | Willis et al. | |
| 6,006,319 A | 12/1999 | Takahashi et al. | |
| 6,023,755 A | 2/2000 | Casselman | |
| 6,026,479 A | 2/2000 | Fisher et al. | |
| 6,041,401 A * | 3/2000 | Ramsey | G06F 1/3215 711/E12.017 |
| 6,058,056 A * | 5/2000 | Beffa | G11C 7/22 365/189.07 |
| 6,075,546 A | 6/2000 | Hussain et al. | |
| 6,076,139 A | 6/2000 | Welker et al. | |
| 6,076,152 A | 6/2000 | Huppenthal et al. | |
| 6,097,402 A | 8/2000 | Case et al. | |
| 6,098,169 A | 8/2000 | Ranganathan | |
| 6,125,421 A | 9/2000 | Roy | |
| 6,154,419 A | 11/2000 | Shakkarwar | |
| 6,170,001 B1 | 1/2001 | Hinds et al. | |
| 6,175,915 B1 | 1/2001 | Cashman et al. | |
| 6,195,676 B1 | 2/2001 | Spix et al. | |
| 6,202,133 B1 | 3/2001 | Jeddeloh | |
| 6,209,067 B1 * | 3/2001 | Collins | G06F 12/0831 710/240 |
| 6,212,544 B1 | 4/2001 | Borkenhagen et al. | |
| 6,240,508 B1 | 5/2001 | Brown, III et al. | |
| 6,243,791 B1 * | 6/2001 | Vondran, Jr. | G06F 12/0846 711/120 |
| 6,308,255 B1 * | 10/2001 | Gorishek, IV | G06F 9/3879 710/104 |
| 6,308,323 B1 | 10/2001 | Douniwa | |
| 6,339,813 B1 | 1/2002 | Smith, III et al. | |
| 6,342,892 B1 * | 1/2002 | Van Hook | A63F 13/00 345/419 |
| 6,345,384 B1 | 2/2002 | Sato | |
| 6,430,103 B2 * | 8/2002 | Nakayama | G11C 7/1006 365/189.05 |
| 6,434,687 B1 | 8/2002 | Huppenthal | |
| 6,473,777 B1 * | 10/2002 | Hendler | G06F 9/3879 |
| 6,473,831 B1 | 10/2002 | Schade | |
| 6,480,952 B2 * | 11/2002 | Gorishek, IV | G06F 9/3879 703/26 |
| 6,507,894 B1 * | 1/2003 | Hoshi | G06F 12/0848 711/131 |
| 6,510,164 B1 * | 1/2003 | Ramaswamy | H04L 45/00 370/235 |
| 6,567,900 B1 | 5/2003 | Kessler | |
| 6,611,908 B2 | 8/2003 | Lentz et al. | |
| 6,665,790 B1 | 12/2003 | Glossner, III et al. | |
| 6,684,305 B1 | 1/2004 | Deneau | |
| 6,701,424 B1 | 3/2004 | Liao et al. | |
| 6,738,967 B1 | 5/2004 | Radigan | |
| 6,751,700 B2 * | 6/2004 | Donoghue | G06F 12/0835 711/128 |
| 6,789,167 B2 * | 9/2004 | Naffziger | G06F 12/0802 711/118 |
| 6,831,979 B2 | 12/2004 | Callum | |
| 6,839,828 B2 | 1/2005 | Gschwind et al. | |
| 6,868,472 B1 * | 3/2005 | Miyake | G06F 12/0802 711/118 |
| 6,891,543 B2 | 5/2005 | Wyatt | |
| 6,948,158 B2 | 9/2005 | Van Gageldonk et al. | |
| 6,954,845 B2 | 10/2005 | Arnold et al. | |
| 6,978,451 B2 | 12/2005 | Heeb | |
| 6,983,456 B2 | 1/2006 | Poznanovic et al. | |
| 7,000,211 B2 | 2/2006 | Arnold | |
| 7,028,286 B2 | 4/2006 | Larin et al. | |
| 7,065,631 B2 | 6/2006 | Weaver | |
| 7,120,755 B2 | 10/2006 | Jamil et al. | |
| 7,149,867 B2 | 12/2006 | Poznanovic et al. | |
| 7,167,971 B2 | 1/2007 | Asaad et al. | |
| 7,225,324 B2 | 5/2007 | Huppenthal et al. | |
| 7,228,531 B1 | 6/2007 | Langhammer | |
| 7,237,088 B2 | 6/2007 | Barry et al. | |
| 7,257,757 B2 | 8/2007 | Chun et al. | |
| 7,278,122 B2 | 10/2007 | Willis | |
| 7,313,673 B2 | 12/2007 | Abernathy et al. | |
| 7,328,195 B2 | 2/2008 | Willis | |
| 7,360,060 B2 * | 4/2008 | Chauvel | G06F 9/30101 711/E12.009 |
| 7,367,021 B2 | 4/2008 | Ansari et al. | |
| 7,376,812 B1 * | 5/2008 | Sanghavi | G06F 9/30021 712/22 |
| 7,418,571 B2 | 8/2008 | Wolrich et al. | |
| 7,421,565 B1 | 9/2008 | Kohn | |
| 7,434,029 B2 * | 10/2008 | Chauvel | G06F 9/30101 711/E12.009 |
| 7,508,325 B2 | 3/2009 | Brokenshire et al. | |
| 7,543,282 B2 | 6/2009 | Chou | |
| 7,546,441 B1 | 6/2009 | Ansari et al. | |
| 7,577,822 B2 * | 8/2009 | Vorbach | G06F 15/7867 712/34 |
| 7,643,353 B1 | 1/2010 | Srinivasan et al. | |
| 7,665,078 B2 | 2/2010 | Liebenow | |
| 7,886,129 B2 * | 2/2011 | Hudepohl | G06F 9/3836 710/5 |
| 7,895,585 B2 | 2/2011 | Prakash et al. | |
| 7,904,703 B1 | 3/2011 | Kang et al. | |
| 8,020,169 B2 | 9/2011 | Yamasaki | |
| 8,095,735 B2 | 1/2012 | Brewer et al. | |
| 8,095,778 B1 | 1/2012 | Golla | |
| 8,122,229 B2 * | 2/2012 | Wallach | G06F 9/30185 712/34 |

(56) References Cited

U.S. PATENT DOCUMENTS

| | | | |
|---|---|---|---|
| 8,136,102 B2 | 3/2012 | Papakipos et al. | |
| 8,156,307 B2* | 4/2012 | Wallach | G06F 9/3879 |
| | | | 711/203 |
| 8,196,127 B2 | 6/2012 | Gschwind | |
| 8,205,066 B2* | 6/2012 | Brewer | G06F 9/30036 |
| | | | 712/34 |
| 8,327,325 B2 | 12/2012 | Chung et al. | |
| 8,458,629 B2 | 6/2013 | Caldwell et al. | |
| 8,484,588 B2 | 7/2013 | Ng et al. | |
| 8,972,958 B1 | 3/2015 | Brewer | |
| 9,069,553 B2 | 6/2015 | Zaarur et al. | |
| 9,710,384 B2* | 7/2017 | Wallach | G06F 12/0844 |
| 2001/0004753 A1* | 6/2001 | Dell | G06F 12/0646 |
| | | | 711/5 |
| 2001/0011342 A1 | 8/2001 | Pechanek et al. | |
| 2001/0049816 A1 | 12/2001 | Rupp | |
| 2002/0013892 A1 | 1/2002 | Gorishek et al. | |
| 2002/0046324 A1 | 4/2002 | Barroso et al. | |
| 2002/0099907 A1* | 7/2002 | Castelli | G06F 12/0871 |
| | | | 711/113 |
| 2002/0100029 A1 | 7/2002 | Bowen | |
| 2002/0135583 A1* | 9/2002 | Ohba | G06F 13/28 |
| | | | 345/505 |
| 2002/0144061 A1* | 10/2002 | Faanes | G06F 9/3004 |
| | | | 711/126 |
| 2003/0005424 A1 | 1/2003 | Ansari et al. | |
| 2003/0046521 A1 | 3/2003 | Shoemaker | |
| 2003/0140222 A1 | 7/2003 | Ohmi et al. | |
| 2003/0226018 A1* | 12/2003 | Tardo | G06F 21/72 |
| | | | 713/168 |
| 2004/0003170 A1 | 1/2004 | Gibson et al. | |
| 2004/0019762 A1* | 1/2004 | Fukuoka | G06F 12/1027 |
| | | | 711/203 |
| 2004/0068622 A1* | 4/2004 | Van Doren | G06F 12/0808 |
| | | | 711/146 |
| 2004/0088524 A1* | 5/2004 | Chauvel | G06F 9/30101 |
| | | | 712/205 |
| 2004/0107331 A1 | 6/2004 | Baxter | |
| 2004/0117599 A1 | 6/2004 | Mittal et al. | |
| 2004/0153610 A1* | 8/2004 | Chi | G06F 12/0804 |
| | | | 711/144 |
| 2004/0193837 A1 | 9/2004 | Devaney et al. | |
| 2004/0193852 A1 | 9/2004 | Johnson | |
| 2004/0194048 A1 | 9/2004 | Arnold | |
| 2004/0215898 A1 | 10/2004 | Arimilli et al. | |
| 2004/0221127 A1 | 11/2004 | Ang | |
| 2004/0236920 A1* | 11/2004 | Sheaffer | G06F 9/30036 |
| | | | 711/165 |
| 2004/0243984 A1 | 12/2004 | Vorbach et al. | |
| 2004/0250046 A1 | 12/2004 | Gonzalez et al. | |
| 2004/0267970 A1* | 12/2004 | Jirgal | G06F 13/28 |
| | | | 710/1 |
| 2005/0027970 A1 | 2/2005 | Arnold et al. | |
| 2005/0044539 A1 | 2/2005 | Liebenow | |
| 2005/0108503 A1 | 5/2005 | Sandon et al. | |
| 2005/0125754 A1 | 6/2005 | Schubert et al. | |
| 2005/0149931 A1 | 7/2005 | Lin et al. | |
| 2005/0172099 A1 | 8/2005 | Lowe | |
| 2005/0188368 A1 | 8/2005 | Kinney | |
| 2005/0193359 A1 | 9/2005 | Gupta et al. | |
| 2005/0198442 A1* | 9/2005 | Mandler | G06F 12/126 |
| | | | 711/145 |
| 2005/0223369 A1 | 10/2005 | Chun et al. | |
| 2005/0262278 A1 | 11/2005 | Schmidt | |
| 2006/0075060 A1 | 4/2006 | Clark | |
| 2006/0095901 A1 | 5/2006 | Brokenshire et al. | |
| 2006/0149941 A1 | 7/2006 | Colavin et al. | |
| 2006/0259737 A1 | 11/2006 | Sachs et al. | |
| 2006/0288191 A1 | 12/2006 | Asaad et al. | |
| 2007/0005881 A1 | 1/2007 | Garney | |
| 2007/0005932 A1 | 1/2007 | Covelli et al. | |
| 2007/0038843 A1 | 2/2007 | Trivedi et al. | |
| 2007/0106833 A1 | 5/2007 | Rankin et al. | |
| 2007/0130445 A1 | 6/2007 | Lau et al. | |
| 2007/0153907 A1 | 7/2007 | Mehta et al. | |
| 2007/0157166 A1 | 7/2007 | Stevens | |
| 2007/0186210 A1 | 8/2007 | Hussain et al. | |
| 2007/0204107 A1* | 8/2007 | Greenfield | G06F 12/0864 |
| | | | 711/128 |
| 2007/0226424 A1* | 9/2007 | Clark | G06F 12/0817 |
| | | | 711/141 |
| 2007/0245097 A1 | 10/2007 | Gschwind et al. | |
| 2007/0283336 A1 | 12/2007 | Gschwind et al. | |
| 2007/0288701 A1 | 12/2007 | Hofstee et al. | |
| 2007/0294666 A1 | 12/2007 | Papakipos et al. | |
| 2008/0059758 A1 | 3/2008 | Sachs | |
| 2008/0059759 A1 | 3/2008 | Sachs | |
| 2008/0059760 A1 | 3/2008 | Sachs | |
| 2008/0104365 A1 | 5/2008 | Kohno et al. | |
| 2008/0115113 A1 | 5/2008 | Codrescu et al. | |
| 2008/0177996 A1 | 7/2008 | Simar et al. | |
| 2008/0209127 A1* | 8/2008 | Brokenshire | G06F 12/0802 |
| | | | 711/125 |
| 2008/0215854 A1* | 9/2008 | Asaad | G06F 8/443 |
| | | | 712/214 |
| 2009/0064095 A1 | 3/2009 | Wallach et al. | |
| 2009/0144690 A1 | 6/2009 | Spackman et al. | |
| 2009/0172364 A1 | 7/2009 | Sprangle et al. | |
| 2009/0177843 A1* | 7/2009 | Wallach | G06F 12/0844 |
| | | | 711/131 |
| 2009/0219779 A1 | 9/2009 | Mao et al. | |
| 2010/0002572 A1 | 1/2010 | Garrett | |
| 2010/0036997 A1 | 2/2010 | Brewer et al. | |
| 2010/0070516 A1 | 3/2010 | Adler | |
| 2010/0138587 A1 | 6/2010 | Hutson | |
| 2011/0055516 A1 | 3/2011 | Willis | |
| 2011/0276787 A1 | 11/2011 | Koga et al. | |
| 2012/0036514 A1 | 2/2012 | Master et al. | |
| 2012/0042121 A1 | 2/2012 | Kim et al. | |
| 2012/0131309 A1 | 5/2012 | Johnson et al. | |
| 2012/0192163 A1 | 7/2012 | Glendenning et al. | |

OTHER PUBLICATIONS

Hauck, S. et al., "Sotware Technologies for Reconfigurable Systems," Northwestern University, Dept. of ECE, Technical Report, 1996, 40 pages.

Leidel, J.D. et al., "CHOMP: A Framework and Instruction Set for Latency Tolerant, Massively Multithreaded Processors," Convey Computer Corporation, Richardson, Texas, 12 pages.

Bombieri, N. et al., HIFSuite: Tools for HDL Code Conversion and Manipulation, Dec. 1, 2009, Accepted Oct. 12, 2010, Hindawi Publishing Corporation, 20 pages.

FreeBSD, "Manual Reference Pages—A.OUT (5)," Jun. 5, 1993, 6 pages.

Alverson, R. et al., "The Tera Computer System," Tera Computer Company, Seattle Washington, ACM 1990, 6 pages.

Bekerman, M. et al., "Performance and Hardware Complexity Tradeoffs in Designing Multithreaded Architectures," IEEE Proceedings of PACT 1996, pp. 24-34, 11 pages.

Tumeo, A. et al., "Designing Next-Generation Massively Multithreaded Architectures for Irregular Applications," Pacific Northwest National Laboratory, IEEE Computer Society, Aug. 2012, 9 pages.

Kumar, R. et al., "Single-ISA Heterogeneous Multi-Core Architectures: The Potential for Processor Power Reduction," 36th Annual IEEE/ACM International Symposium on Microarchitecture 2003, Dec. 2003, Retrieved on [Jun. 7, 2013] Retrieved from the Internet: URL<http://ieeexplore.ieee.org/stamp/stamp.jsp?tp=&arnumber=1253185>, 12 pages.

Fidanci, O.D. et al., "Performance and Overhead in a Hybrid Reconfigurable Computer," Proceedings. International Parallel and Distributed Processing Symposium 2003, Apr. 2003, Retrieved on [Jun. 7, 2013], Retrieved from the Internet: URL<http://ieeexplore.ieee.org/stamp/stamp.jsp?tp=&arnumber=1213325>, 8 pages.

Vassiliadis, N. et al., "The ARISE Reconfigurable Instruction Set Extensions Framework," Sect. of Electronics & Computers, Department of Physics, Aristotle University of Thessaloniki, Jul. 16, 2007, 8 pages.

(56) References Cited

OTHER PUBLICATIONS

Estrin, G., "Organization of Computer Systems—The Fixed Plus Variable Structure Computer," Department of Engineering and Department of Mathematics, University of California, Los Angeles, 1960, 8 pages.
Hauck, S. "The Roles of FPGA's in Reprogrammable Systems," Proceedings of the IEEE, vol. 86, No. 4, 615-638, Apr. 1998, 24 pages.
Shirazi, N. et al., "Run-Time Management of Dynamically Reconfigurable Designs," Field-Programmable Logic and Applications from FPGAs to Computing Paradigm, 1998, 10 pages.
Page, I., "Reconfigurable Processor Architectures," Microprocessors and Microsystems, vol. 20, Issue 3, May 1996, pp. 185-196, 12 pages.
Callahan, T. J. et al., "The Garp Architecture and C Compiler", IEEE Computer, vol. 33, No. 4. pp. 62-69, Apr. 2000, 8 pages.
Agarwal, B., "Instruction Fetch Execute Cycle," CS 518 Fall 2004, 10 pages.
The Cell Project at IBM Research, "The Cell Synergistic Processor Unit (SPU)," http://www.research.ibm.com/cell/SPU.html, 1 page.
The Cell Project at IBM Research, "Heterogeneous Chip Multiprocessing," http://www.research.ibm.com/cell/heterogeneousCMP.html, 1 page.
Eichenberger, A.E. et al., "Using Advanced Compiler Technology to Exploit the Performance of the Cell Broadband Engine™ Architecture," IBM Systems Journal, vol. 45, No. 1, 2006, 26 pages.
The PC Guide, "The PC's x86 Instruction Set," http://www.pcguide.com/ref/cpu.arch/int/instX86-c.html, 2004, 3 pages.
Koch, A. et al., "A Universal Co-Processor for Workstations," Abingdon EE&CS Books, 1994, 14 pages.
Bhuyan, L.N.,"Lecture 15: Symmetric Multiprocessor: Cache Protocols," Feb. 28, 2001, 16 pages.
Levine, B. A. et al., "Efficient Application Representation for HASTE: Hybrid Architectures with a Single, Transformable Executable, " Proceedings of the IEEE Symp. on FCCM, 2003, 10 pages.
Siewiorek, D. P. et al., "Computer Structures: Principles and Examples" McGraw-Hill. 1982, p. 334, Figure 1(a), 2 pages.
Cray XD1™ FPGA Development, Release 1.2; S-6400-12, issued Apr. 18, 2005. Available at www.eng.uah.edu/~jacksoa/CrayXD1FPGADevelopment.pdf, 74 pages.
Poster entitled "GigaScale Mixed-Signal System Verification," FTL Systems, Inc. presented at the DARPA/MTO Team/NeoCAD2003 Fall Review, Sep. 15-17, 2003, Monterey, CA, a public unclassified meeting, 1 page.
Poster entitled "StarStream™ GigaScale Mixed-Signal System Verification," FTL Systems, Inc. presented at the DARPA/MTO Team/NeoCAD Program Review, Feb. 23, 2004, Scottsdale, AZ, Monterey, CA, a public unclassified meeting, 1 page.
StarStream Design Summary; FTL Systems, Inc., available at Design Automation Conference (DAC), Jun. 13-17, 2005, Anaheim, CA., 8 pages.
Gokhale, M. "Heterogeneous Processing," Los Alamos Computer Science Institute LACSI 2006, Oct. 17-19, 2006, Santa Fe, NM. Available at www.cct.lsu.edu~estrabd/LACSI2006/workshops/workshop5/gokhale_mccormick.pdf, 24 pages.
Belgard, R., "Reconfigurable Illogic", Microprocessor, The Insiders Guide to Microprocessor Hardware, May 10, 2004, 4 pages.
Tredennick, N. et al., "Microprocessor Sunset," Microprocessor, The Insiders Guide to Microprocessor Hardware, May 3, 2004, 4 pages.
Arnold, J. M., et al. "The Splash 2 Processor and Applications," 1993, IEEE, pp. 482-485, 4 pages.
Gokhale, M. et al., "Reconfigurable Computing," Accelerating Computation with Field-Programmable Gate Arrays, ©Springer 2005, pp. 4 and 60-64, 6 pages.
Xess Corporation, "XSA Board V1.1, V1.2 User Manua,'" Release Date: Jun. 23, 2005, 48 pages.
Xess, "XSA-50 Spartan-2 Prototyping Board with 2.5V, 50,000-gate FPGA," (copyright 1998-2008), http://www.xess.com/prod027.php3, 2 pages.
The Extended European Search Report issued for EP 08827665.4, dated Nov. 5, 2010, 6 pages.
International Search Report and Written Opinion issued for PCT/US2009/051096, dated Oct. 26, 2009, 9 pages.
International Search Report and Written Opinion issued for PCT/US09/60820, dated Dec. 9, 2009, 8 pages.
International Search Report and Written Opinion issued for PCT/US09/60811, dated Dec. 1, 2009, 7 pages.
International Search Report and Written Opinion issued for PCT/US2013/042439, dated Dec. 16, 2013, 10 pages.
International Search Report and Written Opinion issued for PCT/US08/74566 dated Nov. 14, 2008, 9 pages.
International Search Report and Written Opinion issued for PCT/US08/73423 dated Nov. 12, 2008, 12 pages.
International Search Report and Written Opinion issued for PCT/US08/75828 dated Nov. 18, 2008, 12 pages.
International Search Report and Written Opinion issued for PCT/US08/87233, dated Feb. 5, 2009, 11 pages.

\* cited by examiner

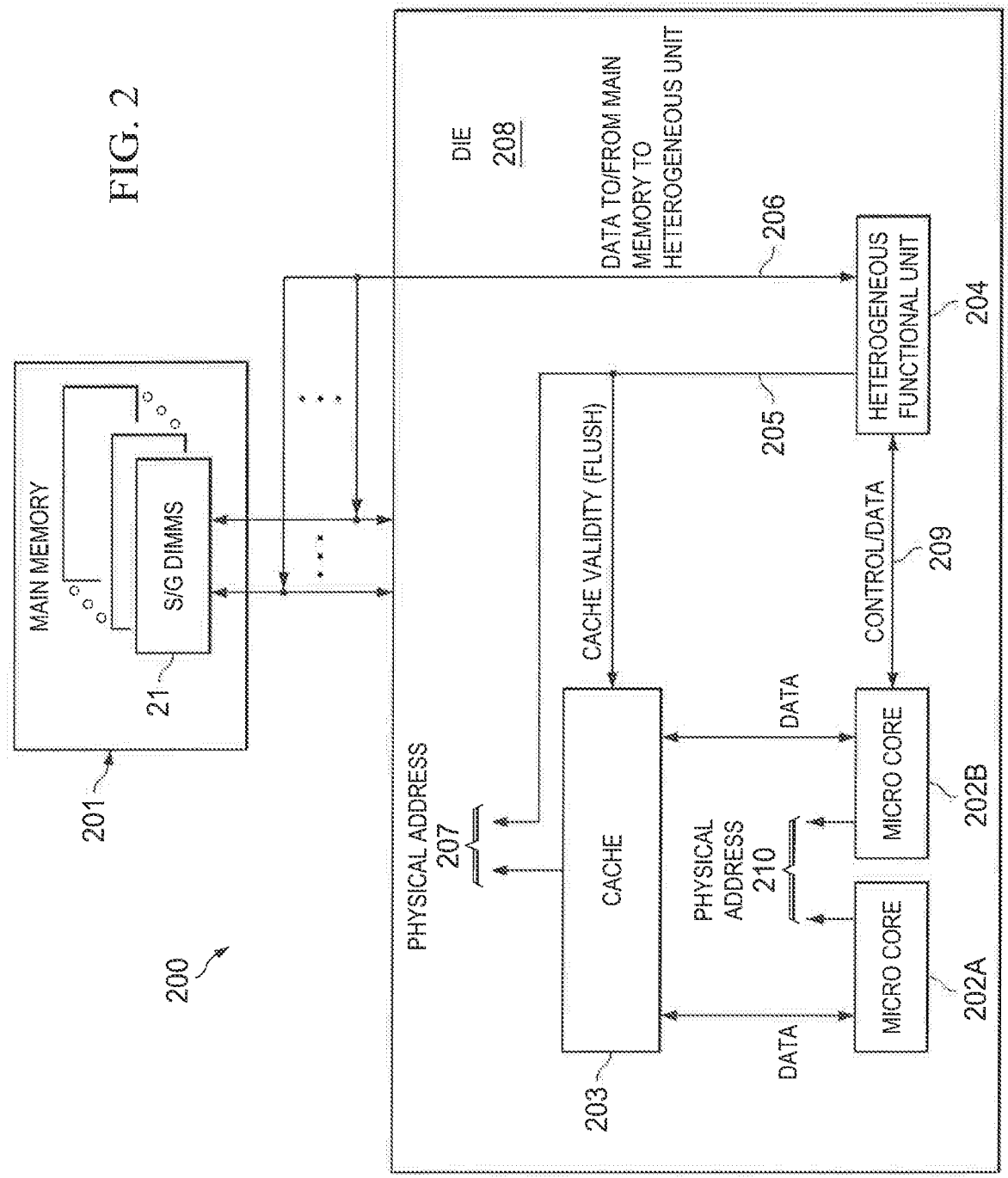

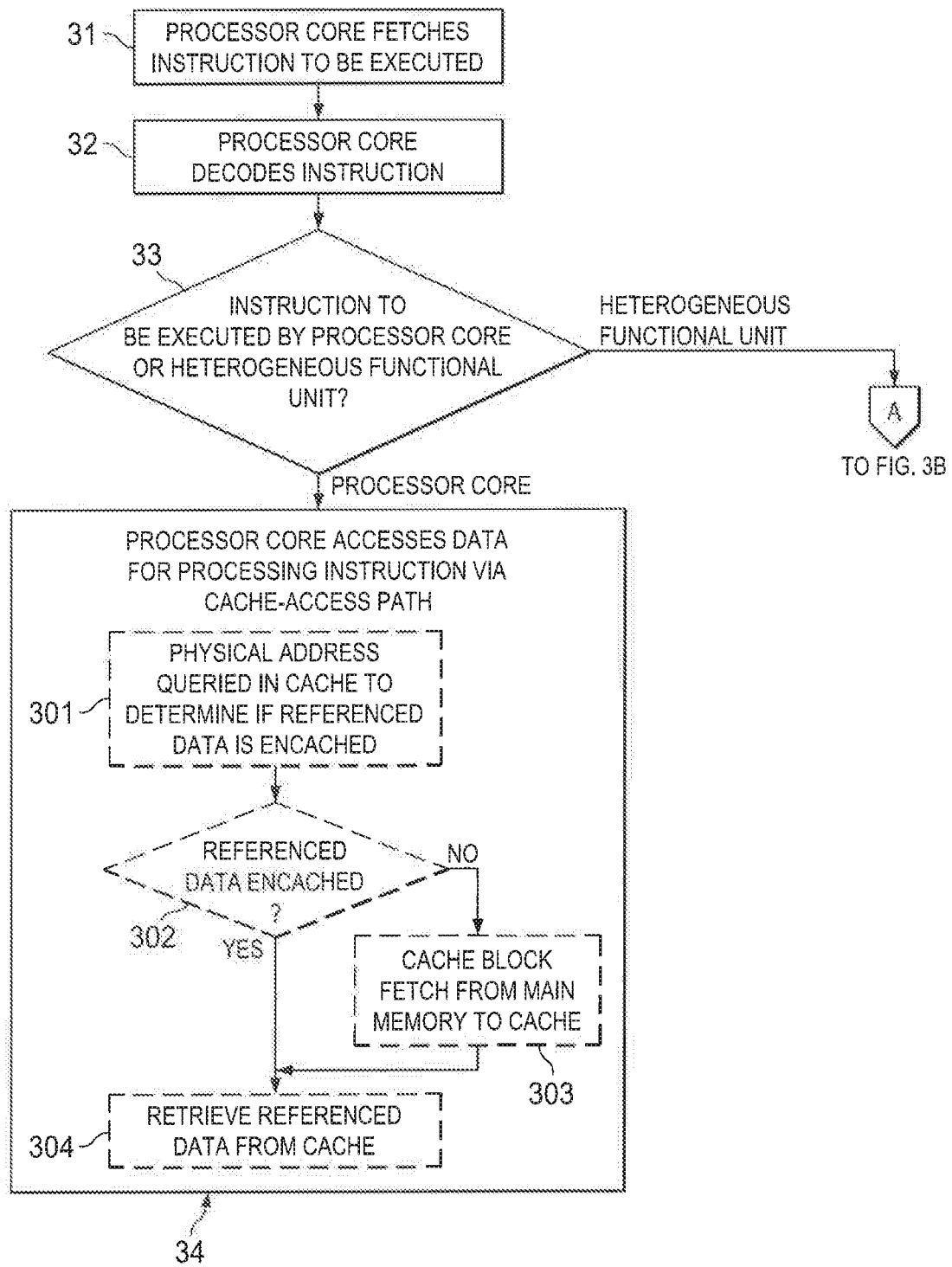

MICROPROCESSOR ARCHITECTURE HAVING ALTERNATIVE MEMORY ACCESS PATHS

The present application is a continuation of co-pending, commonly assigned, patent application Ser. No. 11/969,792 entitled "MICROPROCESSOR ARCHITECTURE HAVING ALTERNATIVE MEMORY ACCESS PATHS," filed Jan. 4, 2008, the disclosure of which is hereby incorporated herein by reference. The present application relates to the following co-pending and commonly-assigned U.S. Patent Applications, U.S. patent application Ser. No. 11/841,406 filed Aug. 20, 2007 titled "MULTI-PROCESSOR SYSTEM HAVING AT LEAST ONE PROCESSOR THAT COMPRISES A DYNAMICALLY RECONFIGURABLE INSTRUCTION SET", U.S. patent application Ser. No. 11/854,432 filed Sep. 12, 2007 titled "DISPATCH MECHANISM FOR DISPATCHING INSTRUCTIONS FROM A HOST PROCESSOR TO A CO-PROCESSOR", and U.S. patent application Ser. No. 11/847,169 filed Aug. 29, 2007 titled "COMPILER FOR GENERATING AN EXECUTABLE COMPRISING INSTRUCTIONS FOR A PLURALITY OF DIFFERENT INSTRUCTION SETS", the disclosures of which are hereby incorporated herein by reference.

TECHNICAL FIELD

The following description relates generally to multi-processor systems, and more particularly to a system having two memory access paths: 1) a cache-access path in which block data is fetched from main memory for loading to a cache, and 2) a direct-access path in which individually-addressed data is fetched from main memory for directly loading data into processor registers and/or storing data.

BACKGROUND

The popularity of computing systems continues to grow and the demand for improved processing architectures thus likewise continues to grow. Ever-increasing desires for improved computing performance/efficiency has led to various improved processor architectures. For example, multi-core processors are becoming more prevalent in the computing industry and are being used in various computing devices, such as servers, personal computers (PCs), laptop computers, personal digital assistants (PDAs), wireless telephones, and so on.

In the past, processors such as CPUs (central processing units) featured a single execution unit to process instructions of a program. More recently, computer systems are being developed with multiple processors in an attempt to improve the computing performance of the system. In some instances, multiple independent processors may be implemented in a system. In other instances, a multi-core architecture may be employed, in which multiple processor cores are amassed on a single integrated silicon die. Each of the multiple processors (e.g., processor cores) can simultaneously execute program instructions. This parallel operation of the multiple processors can improve performance of a variety of applications.

A multi-core CPU combines two or more independent cores into a single package comprised of a single piece silicon integrated circuit (IC), called a die. In some instances, a multi-core CPU may comprise two or more dies packaged together. A dual-core device contains two independent microprocessors and a quad-core device contains four microprocessors. Cores in a multi-core device may share a single coherent cache at the highest on-device cache level (e.g., L2 for the Intel® Core 2) or may have separate caches (e.g. current AMD® dual-core processors). The processors also share the same interconnect to the rest of the system. Each "core" may independently implement optimizations such as superscalar execution, pipelining, and multithreading. A system with N cores is typically most effective when it is presented with N or more threads concurrently.

One processor architecture that has been developed utilizes multiple processors (e.g., multiple cores), which are homogeneous in that they are all implemented with the same fixed instruction sets (e.g., Intel's x86 instruction set, AMD's Opteron instruction set, etc.). Further, the homogeneous processors may employ a cache memory coherency protocol, as discussed further below.

In general, an instruction set refers to a list of all instructions, and all their variations, that a processor can execute. Such instructions may include, as examples, arithmetic instructions, such as ADD and SUBTRACT; logic instructions, such as AND, OR, and NOT; data instructions, such as MOVE, INPUT, OUTPUT, LOAD, and STORE; and control flow instructions, such as GOTO, if X then GOTO, CALL, and RETURN. Examples of well-known instruction sets include x86 (also known as IA-32), x86-64 (also known as AMD64 and Intel® 64), AMD's Opteron, VAX (Digital Equipment Corporation), IA-64 (Itanium), and PA-RISC (HP Precision Architecture).

Generally, the instruction set architecture is distinguished from the microarchitecture, which is the set of processor design techniques used to implement the instruction set. Computers with different microarchitectures can share a common instruction set. For example, the Intel® Pentium and the AMD® Athlon implement nearly identical versions of the x86 instruction set, but have radically different internal microarchitecture designs. In all these cases the instruction set (e.g., x86) is fixed by the manufacturer and directly hardware implemented, in a semiconductor technology, by the microarchitecture. Consequently, the instruction set is fixed for the lifetime of this implementation.

Cache memory coherency is an issue that affects the design of computer systems in which two or more processors share a common area of memory. In general, processors often perform work by reading data from persistent storage (e.g., disk) into memory, performing some operation on that data, and then storing the result back to persistent storage. In a uniprocessor system, there is only one processor doing all the work, and therefore only one processor that can read or write the data values. Moreover a simple uniprocessor can only perform one operation at a time, and thus when a value in storage is changed, all subsequent read operations will see the updated value. However, in multiprocessor systems (e.g., multi-core architectures) there are two or more processors working at the same time, and so the possibility that the processors will all attempt to process the same value at the same time arises. Provided none of the processors updates the value, then they can share it indefinitely; but as soon as one updates the value, the others will be working on an out-of-date copy of the data. Accordingly, in such multiprocessor systems a scheme is generally required to notify all processors of changes to shared values, and such a scheme that is employed is commonly referred to as a "cache coherence protocol." Various well-known protocols have been developed for maintaining cache coherency in multiprocessor systems, such as the MESI protocol, MSI protocol, MOSI protocol, and the MOESI protocol, are examples.

Accordingly, such cache coherency generally refers to the integrity of data stored in local caches of the multiple processors.

FIG. 1 shows an exemplary prior art system 100 in which multiple homogeneous processors (or cores) are implemented. System 100 comprises two subsystems: 1) a main memory (physical memory) subsystem 101 and 2) a processing subsystem 102 (e.g., a multi-core die). System 100 includes a first microprocessor core 104A and a second microprocessor core 104B. In this example, microprocessor cores 104A and 104B are homogeneous in that they are each implemented to have the same, fixed instruction set, such as x86. Further, in this example, cores 104A and 104B are implemented on a common die 102. Main memory 101 is communicatively connected to processing subsystem 102. Main memory 101 comprises a common physical address space that microprocessor cores 104A and 104B can each reference.

As shown further shown, a cache 103 is also implemented on die 102. Cores 104A and 104B are each communicatively coupled to cache 103. As is well known, a cache generally is memory for storing a collection of data duplicating original values stored elsewhere (e.g., to main memory 101) or computed earlier, where the original data is expensive to fetch (due to longer access time) or to compute, compared to the cost of reading the cache. In other words, a cache 103 generally provides a temporary storage area where frequently accessed data can be stored for rapid access. Once the data is stored in cache 103, future use can be made by accessing the cached copy rather than re-fetching the original data from main memory 101, so that the average access time is shorter. In many systems, cache access times are approximately 50 times faster than similar accesses to main memory 101. Cache 103, therefore, helps expedite data access that the micro-cores 104A and 104B would otherwise have to fetch from main memory 101.

In many system architectures, each core 104A and 104B will have its own cache also, commonly called the "L1" cache, and cache 103 is commonly referred to as the "L2" cache. Unless expressly stated herein, cache 103 generally refers to any level of cache that may be implemented, and thus may encompass L1, L2, etc. Accordingly, while shown for ease of illustration as a single block that is accessed by both of cores 104A and 104B, cache 103 may include L1 cache that is implemented for each core. Again, a cache coherency protocol may be employed to maintain the integrity of data stored in local caches of the multiple processor cores 104A/104B, as is well known.

In many architectures, virtual addresses are utilized. In general, a virtual address is an address identifying a virtual (non-physical) entity. As is well-known in the art, virtual addresses may be utilized for accessing memory. Virtual memory is a mechanism that permits data that is located on a persistent storage medium (e.g., disk) to be referenced as if the data was located in physical memory. Translation tables, maintained by the operating system, are used to determine the location of the reference data (e.g., disk or main memory). Program instructions being executed by a processor may refer to a virtual memory address, which is translated into a physical address. To minimize the performance penalty of address translation, most modern CPUs include an on-chip Memory Management Unit (MMU), and maintain a table of recently used virtual-to-physical translations, called a Translation Look-aside Buffer (TLB). Addresses with entries in the TLB require no additional memory references (and therefore time) to translate. However, the TLB can only maintain a fixed number of mappings between virtual and physical addresses; when the needed translation is not resident in the TLB, action will have to be taken to load it in.

As an example, suppose a program's instruction stream that is being executed by a processor, say processor core 104A of FIG. 1, desires to load data from an address "Foo" into a first general-purpose register, GPR1. Such instruction may appear similar to "LD <Foo>, GRP1". Foo, in this example, is a virtual address that the processor translates to a physical address, such as address "123456". Thus, the actual physical address, which may be formatted according to a global physical memory address format, is used to access cache 103 and/or memory 101.

Traditional implementations of cache 103 have proven to be extremely effective in many areas of computing because access patterns in many computer applications have locality of reference. There are several kinds of locality, including data that are accessed close together in time (temporal locality) and data that is located physically close to each other (spatial locality).

In operation, each of cores 104A and 104B reference main memory 101 by providing a physical memory address. The physical memory address (of data or "an operand" that is desired to be retrieved) is first inputted to cache 103. If addressed data is not encached (i.e., not present in cache 103), the same physical address is presented to main memory 101 to retrieve the desired data.

In contemporary architectures, a cache block is fetched from main memory 101 and loaded into cache 103. That is, rather than retrieving only the addressed data from main memory 101 for storage to cache 103, a larger block of data may be retrieved for storage to cache 103. A cache block typically comprises a fixed-size amount of data that is independent of the actual size of the requested data. For example, in most implementations a cache block comprises 64 bytes of data that is fetched from main memory 101 and loaded into cache 103 independent of the actual size of the operand referenced by the requesting micro-core 104A/104B. Furthermore, the physical address of the cache block referenced and loaded is a block address. This means that all the cache block data is in sequentially contiguous physical memory. Table 1 below shows an example of a cache block.

TABLE 1

| Physical Address | Operand |
|---|---|
| X, Y, Z (7) | Operand 7 |
| X, Y, Z (6) | Operand 6 |
| ... | ... |
| X, Y, Z (1) | Operand 1 |
| X, Y, Z (0) | Operand 0 |

In the example of table 1, in response to a micro-core 104A/104B requesting Operand 0 via its corresponding physical address X,Y,Z (0), a 64-byte block of data may be fetched from main memory 101 and loaded into cache 103, wherein such block of data includes not only Operand 0 but also Operands 1-7. Thus, depending on the fixed size of the cache block employed on a given system, whenever a core 104A/104B references one operand (e.g., a simple load), the memory system will bring in 4 to 8 to 16 operands into cache 103.

There are both advantages and disadvantages of this traditional approach. One advantage is that if there is temporal (over time) and spatial (data locality) references to operands (e.g., operands 0-7 in the example of Table 1), then cache 103 reduces the memory access time. Typically, cache access times (and data bandwidth) are 50 times faster than similar access to main memory 101. For many applications, this is the memory access pattern.

However, if the memory access pattern of an application is not sequential and/or does not re-use data, inefficiencies arise which result in decreased performance. Consider the following FORTRAN loop that may be executed for a given application:

DO I=1, N, 4
A(i)=B(i)+C(i)
END DO

In this loop, every fourth element is used. If a cache block maintains 8 operands, then only 2 of the 8 operands are used. Thus, 6/8 of the data loaded into cache 103 and 6/8 of the memory bandwidth is "wasted" in this example.

In some architectures, special-purpose processors that are often referred to as "accelerators" are also implemented to perform certain types of operations. For example, a processor executing a program may offload certain types of operations to an accelerator that is configured to perform those types of operations efficiently. Such hardware acceleration employs hardware to perform some function faster than is possible in software running on the normal (general-purpose) CPU. Hardware accelerators are generally designed for computationally intensive software code. Depending upon granularity, hardware acceleration can vary from a small functional unit to a large functional block like motion estimation in MPEG2. Examples of such hardware acceleration include blitting acceleration functionality in graphics processing units (GPUs) and instructions for complex operations in CPUs. Such accelerator processors generally have a fixed instruction set that differs from the instruction set of the general-purpose processor, and the accelerator processor's local memory does not maintain cache coherency with the general-purpose processor.

A graphics processing unit (GPU) is a well-known example of an accelerator. A GPU is a dedicated graphics rendering device commonly implemented for a personal computer, workstation, or game console. Modern GPUs are very efficient at manipulating and displaying computer graphics, and their highly parallel structure makes them more effective than typical CPUs for a range of complex algorithms. A GPU implements a number of graphics primitive operations in a way that makes running them much faster than drawing directly to the screen with the host CPU. The most common operations for early two-dimensional (2D) computer graphics include the BitBLT operation (combines several bitmap patterns using a RasterOp), usually in special hardware called a "blitter", and operations for drawing rectangles, triangles, circles, and arcs. Modern GPUs also have support for three-dimensional (3D) computer graphics, and typically include digital video-related functions.

Thus, for instance, graphics operations of a program being executed by host processors 104A and 104B may be passed to a GPU. While the homogeneous host processors 104A and 104B maintain cache coherency with each other, as discussed above with FIG. 1, they do not maintain cache coherency with accelerator hardware of the GPU. This means that the GPU reads and writes to its local memory are NOT part of the hardware-based cache coherency mechanism used by processors 104A and 104B. This also means that the GPU does not share the same physical or virtual address space of processors 104A and 104B.

Additionally, various devices are known that are reconfigurable. Examples of such reconfigurable devices include field-programmable gate arrays (FPGAs). A field-programmable gate array (FPGA) is a well-known type of semiconductor device containing programmable logic components called "logic blocks", and programmable interconnects. Logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memories. A hierarchy of programmable interconnects allows logic blocks to be interconnected as desired by a system designer. Logic blocks and interconnects can be programmed by the customer/designer, after the FPGA is manufactured, to implement any logical function, hence the name "field-programmable."

SUMMARY

The present invention is directed to a system and method which employ two memory access paths: 1) a cache-access path in which block data is fetched from main memory for loading to a cache, and 2) a direct-access path in which individually-addressed data is fetched from main memory for directly loading data into processor registers and/or storing data. The memory access techniques described herein may be employed for both loading and storing data. Thus, while much of the description provided herein is directed toward exemplary applications of fetching and loading data, it should be understood that the techniques may be likewise applied for storing data. The system may comprise one or more processor cores that utilize the cache-access path for accessing data. The system may further comprise at least one heterogeneous functional unit that is operable to utilize the direct-access path for accessing data. In certain embodiments, the one or more processor cores, cache, and the at least one heterogeneous functional unit may be included on a common semiconductor die (e.g., as part of an integrated circuit). As described further herein, embodiments of the present invention enable improved system performance by selectively employing the cache-access path for certain instructions (e.g., selectively having the processor core(s) process certain instructions) while selectively employing the direct-access path for other instructions (e.g., by offloading those other instructions to the heterogeneous functional unit).

Embodiments of the present invention provide a system in which two memory access paths are employed for accessing data by two or more processing nodes. A first memory access path (which may be referred to herein as a "cache-access path" or a "block-oriented access path") is a path in which a block of data is fetched from main memory to cache. This cache-access path is similar to the traditional memory access described above, whereby if the desired data is present in cache, it is accessed from the cache and if the desired data is not present in the cache it is fetched from main memory and loaded into the cache. Such fetching may load not only the desired data into cache, but may also load some fixed block of data, commonly referred to as a "cache block" as discussed above (e.g., a 64-byte cache block). A second memory access path (which may be referred to herein as a "direct-access path", "cache-bypass path", or "address-oriented access") enables the cache to be bypassed to retrieve data directly from main memory. In such a direct access, data of an individual physical address that is requested may be retrieved, rather than retrieving a block of data that encompasses more than what is desired.

According to certain embodiments of the present invention the main memory is implemented as non-sequential access main memory that supports random address accesses as opposed to block accesses. That is, upon requesting a given physical address, the main memory may return a corresponding operand (data) that is stored to the given physical address, rather than returning a fixed block of data residing at physical addresses. In other words, rather than returning a fixed block of data (e.g., a 64-byte block of data as described in Table 1 above) independent of the requested physical address, the main memory is implemented such that it is dependent on the requested physical address requested (i.e., is capable of returning only the individual data residing at the requested physical address).

When being accessed directly (via the "direct-access path"), the main memory returns the data residing at a given requested physical address, rather than returning a fixed block of data that is independent (in size) of the requested physical address. Thus, rather than a block-oriented access, an address-oriented access may be performed in which only the data for the requested physical address is retrieved. Further, when being accessed via the cache-access path, the main memory is capable of returning a cache block of data. For instance, the non-sequential access main memory can be used to emulate a block reference when desired for loading to a cache, but also supports individual random address accesses without requiring a block load (e.g., when being accessed via the direct-access path). Thus, the same non-sequential access main memory is utilized (with the same physical memory addresses) for both the direct-access and cache-access paths. According to one embodiment, the non-sequential access main memory is implemented by scatter/gather DIMMs (dual in-line memory modules).

According to certain embodiments, the above-mentioned memory architecture is implemented in a system that comprises at least one processor and at least one heterogeneous functional unit. As an example, a semiconductor die (e.g., die 102 of FIG. 1) may comprise one or more processors, such as micro-cores 104A and 104B of FIG. 1, and the semiconductor die may further comprise a heterogeneous functional unit, such as a FPGA or other type of functional unit. In certain embodiments a multi-processor system is implemented; for instance, a plurality of micro-cores (e.g., cores 104A and 104B of FIG. 1) may be implemented on the semiconductor die.

The processor(s) may utilize the cache-access path for accessing memory, while the heterogeneous functional unit is operable to utilize the direct-access path. Thus, certain instructions being processed for a given application may be off-loaded from the one or more processors to the heterogeneous functional unit such that the heterogeneous functional unit may take advantage of the cache-bypass path to access memory for processing those off-loaded instructions. For instance, again consider the following FORTRAN loop that may be executed for a given application:

DO I=1, N, 4
A(i)=B(i)+C(i)
END DO

In this loop, every fourth element (or physical memory address) is used, loaded or stored. As discussed above, if a cache-access path is utilized in which a cache block of 8 operands is retrieved for each access of main memory, then only 2 of the 8 operands are used, and 6/8 of the data loaded into the cache and 6/8 of the memory bandwidth is "wasted" in this example. In certain embodiments of the present invention, such DO loop operation may be off-loaded to the heterogeneous functional unit, which may retrieve the individual data elements desired to be accessed directly from the non-sequential access main memory.

As mentioned above, the cache block memory access approach is beneficial in many instances, such as when the data accesses have temporal and/or spatial locality, but such cache block memory access is inefficient in certain instances, such as in the exemplary DO loop operation above. Accordingly, by selectively employing the cache-access path for certain instructions and employing the direct-access path for other instructions, the overall system performance can be improved. That is, by off-loading certain instructions to a heterogeneous functional unit that is operable to bypass cache and access individual data (e.g., random, non-sequential addresses) from main memory, rather than requiring fetching of fixed block size of data from main memory, while permitting the cache block memory access to be utilized by the one or more processors (and thus gain the benefits of the cache for those instructions that have temporal and/or spatial locality), the system performance can be improved.

In certain embodiments, the heterogeneous functional unit implemented comprises a different instruction set than the native instruction set of the one or more processors. Further, in certain embodiments, the instruction set of the heterogeneous functional unit may be dynamically reconfigurable. As an example, in one implementation three (3) mutually-exclusive instruction sets may be pre-defined, any of which may be dynamically loaded to the heterogeneous functional unit. As an illustrative example, a first pre-defined instruction set might be a vector instruction set designed particularly for processing 64-bit floating point operations as are commonly encountered in computer-aided simulations, a second pre-defined instruction set might be designed particularly for processing 32-bit floating point operations as are commonly encountered in signal and image processing applications, and a third pre-defined instruction set might be designed particularly for processing cryptography-related operations. While three illustrative pre-defined instruction sets are described above, it should be recognized that embodiments of the present invention are not limited to the exemplary instruction sets mentioned above. Rather, any number of instruction sets of any type may be pre-defined in a similar manner and may be employed on a given system in addition to or instead of one or more of the above-mentioned pre-defined instruction sets.

Further, in certain embodiments the heterogeneous functional unit contains some operational instructions that are part of the native instruction set of the one or more processors (e.g., micro-cores). For instance, in certain embodiments, the x86 (or other) instruction set may be modified to include certain instructions that are common to both the processor(s) and the heterogeneous functional unit. For instance, certain operational instructions may be included in the native instruction set of the processor(s) for off-loading instructions to the heterogeneous functional unit.

For example, in one embodiment, the instructions of an application being executed are decoded by the one or more processors (e.g., micro-core(s)). Suppose that the processor fetches a native instruction (e.g., X86 instruction) that is called, as an example, "Heterogeneous Instruction 1". The decode logic of the processor determines that this is an instruction to be off-loaded to the heterogeneous functional unit, and thus in response to decoding the Heterogeneous Instruction 1, the processor initiates a control sequence to the heterogeneous functional unit to communicate the instruction to the heterogeneous functional unit for processing. So, the processor (e.g., micro-core) may decode the instruction and initiate the heterogeneous functional unit via a control line. The heterogeneous functional unit then sends instructions to reference memory via the direct-access path.

In certain embodiments, the heterogeneous functional unit comprises a co-processor, such as the exemplary co-processor disclosed in co-pending and commonly assigned U.S. patent application Ser. No. 11/841,406 filed Aug. 20, 2007 titled "MULTI-PROCESSOR SYSTEM HAVING AT LEAST ONE PROCESSOR THAT COMPRISES A DYNAMICALLY RECONFIGURABLE INSTRUCTION SET", and U.S. patent application Ser. No. 11/854,432 filed Sep. 12, 2007 titled "DISPATCH MECHANISM FOR DISPATCHING INSTRUCTIONS FROM A HOST PROCESSOR TO A CO-PROCESSOR," the disclosures of which have been incorporated herein by reference.

According to certain embodiments, an exemplary multi-processor system in which such dispatch mechanism may be employed is described. While an exemplary multi-processor system that comprises heterogeneous processors (i.e., having different instruction sets) is described herein, it should be recognized that embodiments of the dispatch mechanism described herein are not limited to the exemplary multi-processor system described. As one example, according to certain embodiments, a multi-processor system that comprises at least one processor having a dynamically reconfigurable instruction set. According to certain embodiments, at least one host processor is implemented in the system, which may comprise a fixed instruction set, such as the well-known x86 instruction set. Additionally, at least one co-processor is implemented, which comprises dynamically reconfigurable logic that enables the co-processor's instruction set to be dynamically reconfigured. In this manner, the at least one host processor and the at least one dynamically reconfigurable co-processor are heterogeneous processors because the dynamically reconfigurable co-processor may be configured to have a different instruction set than that of the at least one host processor. According to certain embodiments, the co-processor may be dynamically reconfigured with an instruction set for use in optimizing performance of a given executable. For instance, in certain embodiments, one of a plurality of predefined instruction set images may be loaded onto the co-processor for use by the co-processor in processing a portion of a given executable's instruction stream.

In certain embodiments, an executable (e.g., an a.out file or a.exe file, etc.) may include (e.g., in its header) an identification of an instruction set with which the co-processor is to be configured for use in processing a portion of the executable's instruction stream. Accordingly, when the executable is initiated, the system's operating system (OS) may determine whether the co-processor possesses the instruction set identified for the executable. If determined that the co-processor does not possess the identified instruction set, the OS causes the co-processor to be reconfigured to possess such identified instruction set. Then, a portion of the instructions of the executable may be off-loaded for processing by the co-processor according to its instruction set, while a portion of the executable's instructions may be processed by the at least one host processor. Accordingly, in certain embodiments, a single executable may have instructions that are processed by different, heterogeneous processors that possess different instruction sets. As described further herein, according to certain embodiments, the co-processor's instructions are decoded as if they were defined with the host processor's instruction set (e.g., x86's ISA). In essence, to a compiler, it appears that the host processor's instruction set (e.g., the x86 ISA) has been extended.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention, it should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 2 shows a block diagram of an exemplary system architecture of an embodiment of the present invention; and FIGS. 3A-3B show an exemplary operational flow diagram according to one embodiment of the present invention.

DETAILED DESCRIPTION

Figure 1:
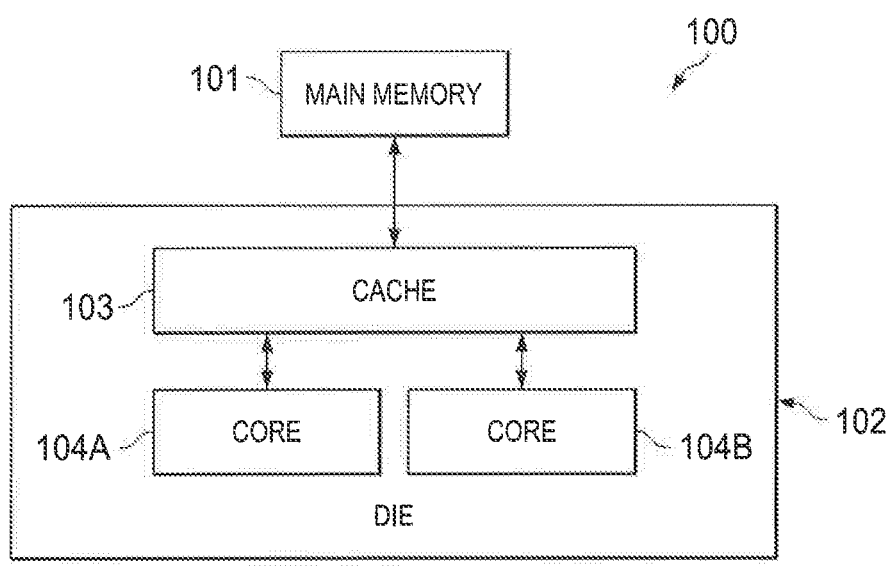
FIG. 1 shows a block diagram of an exemplary system architecture of the prior art.

FIG. 2 shows a block diagram of a system 200 according to one embodiment of the present invention. System 200 comprises two subsystems: 1) main memory (physical memory) subsystem 201 and processor subsystem (semiconductor die) 208. The combination of subsystems 201 and 208 permit programs to be executed, i.e. instructions are executed in processor subsystem 208 to process data stored in main memory subsystem 201. As described further herein, processor subsystem 208 comprises one or more processor cores (two processor cores, 202A and 202B, in the illustrated example), cache 203, and a heterogeneous functional unit 204. In the illustrated example, all elements of processor subsystem 208 are implemented on a common die.

System 200 employs two memory access paths: 1) a cache-access path in which block data is stored/loaded to/from main memory 201 to/from cache 203, and 2) a direct-access path in which individually-addressed data is stored/loaded to/from main memory 201 (e.g., along path 206 in system 200). For instance, system 200 employs a cache-access path in which block data may be stored to main memory 201 and in which block data may be loaded from main memory 201 to cache 203. Additionally, system 200 employs a direct-access path in which individually-addressed data, rather than a fixed-size block of data, may be stored to main memory 201 and in which individually-addressed data may be loaded from main memory 201 (e.g., along path 206 in system 200) to a processor register (e.g., of heterogeneous functional unit 204).

System 200 comprises two processor cores, 202A and 202B, that utilize the cache-access path for accessing data from main memory 201. System 200 further comprises at least one heterogeneous functional unit 204 that is operable to utilize the direct-access path for accessing data from main memory 201. As described further herein, embodiments of the present invention enable improved system performance by selectively employing the cache-access path for certain instructions (e.g., selectively having the processor core(s) 202A/202B process certain instructions) while selectively employing the direct-access path for other instructions (e.g., by offloading those other instructions to the heterogeneous functional unit 204).

Embodiments of the present invention provide a system in which two memory access paths are employed for accessing data by two or more processing nodes. A first memory access path (which may be referred to herein as a "cache-access path" or a "block-oriented access path") is a path in which a block of data is fetched from main memory 201 to cache 203. This cache-access path is similar to the traditional memory access described above with FIG. 1, whereby the processor core decodes an instruction and determines a physical address 210 of desired data. If the desired data (i.e., at the referenced physical address) is present in cache 203 it is accessed from cache 203, and if the desired data is not present in cache 203, the physical address is used to fetch (via path 207) the data from main memory 201, which is loaded into cache 203. Such fetching from main memory 201 may load not only the desired data residing at the referenced physical address into cache 203, but may also load some fixed block of data, commonly referred to as a "cache block" as discussed above (e.g., a 64-byte cache block such as that discussed with Table 1). A second memory access path (which may be referred to herein as a "direct-access path", "cache-bypass path", or "address-oriented access") enables cache 203 to be bypassed to retrieve data directly from main memory 201. In such a direct access, data of an individual physical address that is requested may be retrieved from main memory 201, rather than retrieving a fixed-size block of data that encompasses more than what is desired.

According to certain embodiments of the present invention the main memory is implemented as non-sequential access main memory that supports random address accesses as opposed to block accesses. That is, upon requesting a given physical address, the main memory may return a corresponding operand (data) that is stored to the given physical address, rather than returning a fixed block of data residing at physical addresses. In other words, rather than returning a fixed block of data (e.g., a 64-byte block of data) independent of the requested physical address, the main memory is implemented such that it is dependent on the requested physical address requested (i.e., is capable of returning only the individual data residing at the requested physical address).

According to certain embodiments, processor cores 202A and 202B are operable to access data in a manner similar to that of traditional processor architectures (e.g., that described above with FIG. 1). That is, processor cores 202A and 202B are operable to access data via the cache-access path, in which a fixed-size block of data is fetched from main memory 201 for loading into cache 203, such as described above with exemplary Table 1. In addition, in certain embodiments, processor cores 202A and 202B are operable to off-load (e.g., via control line 209) certain instructions for processing by heterogeneous functional unit 204, which is operable to access data via the direct-access path 206.

When being accessed directly (via the "direct-access path" 206), main memory 201 returns the data residing at a given requested physical address, rather than returning a fixed-size block of data that is independent (in size) of the requested physical address. Thus, rather than a block-oriented access, an address-oriented access may be performed in which only the data for the requested physical address is retrieved. Further, when being accessed via the cache-access path, main memory 201 is capable of returning a cache block of data. For instance, the non-sequential access main memory 201 can be used to emulate a block reference when desired for loading a cache block of data to cache 203, but also supports individual random address accesses without requiring a block load (e.g., when being accessed via the direct-access path 206). Thus, the same non-sequential access main memory 201 is utilized (with the same physical memory addresses) for both the cache-access path (e.g., utilized for data accesses by processor cores 202A and 202B in this example) and the direct-access path (e.g., utilized for data access by heterogeneous functional unit 204). According to one embodiment, non-sequential access main memory 201 is implemented by scatter/gather DIMMs (dual in-line memory modules) 21.

Thus, main memory subsystem 201 supports non-sequential memory references. According to one embodiment, main memory subsystem 201 has the following characteristics:

1) Each memory location is individually addressed. There is no built-in notion of a cache block.

2) The entire physical memory is highly interleaved. Interleaving means that each operand resides in its individually controlled memory location.

3) Thus, full memory bandwidth is achieved for a non-sequentially referenced address pattern. For instance, in the above example of the DO loop that accesses every fourth memory address, the full memory bandwidth is achieved for the address reference pattern: $Address_1$, $Address_5$, $Address_9$, and $Address_{13}$.

4) If the memory reference is derived from a micro-core, then the memory reference pattern is sequential, e.g., physical address reference pattern: $Address_1$, $Address_2$, $Address_3$, . . . $Address_8$ (assuming a cache block of 8 operands or 8 words).

5) Thus, the memory system can support full bandwidth random physical addresses and can also support full bandwidth sequential addresses.

Given a memory system 201 as described above, a mechanism is further provided in certain embodiments to determine whether a memory reference is directed to the cache 203, or directly to main memory 201. In a preferred embodiment of the present invention, a heterogeneous functional unit 204 provides such a mechanism.

Figure 3B:
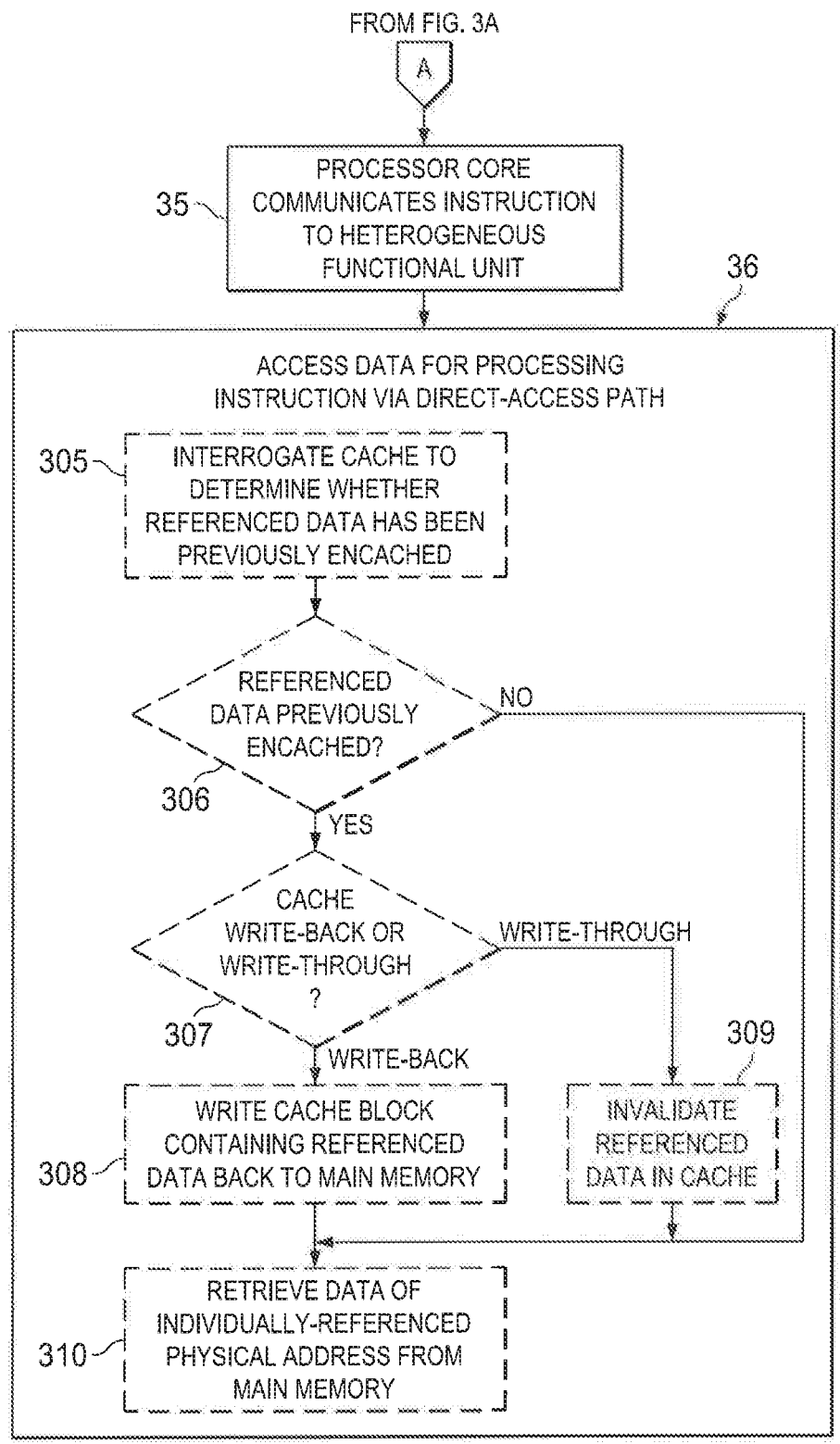

FIGS. 3A-3B show an exemplary operational flow diagram for processing instructions of a program being executed by processor subsystem 208 (of FIG. 2) according to one embodiment of the present invention. According to embodiments, an executable file is provided that includes a first portion of instructions to be processed by a first instruction set (such as a first instruction set of a first processor in a multi-processor system) and a second portion of instructions to be processed by a second instruction set (such as a second instruction set of a second processor in a multi-processor system). In the example of FIGS. 3A-3B, operation of system 200 works as follows: a processor core 202A/202B fetches referenced an instruction (e.g., referenced by a program counter (PC)) of the program being executed in operational block 31. In block 32, the processor core 202A/202B decodes the instruction and determines a physical address 210 at which the desired data resides. In block 33, the processor core determines whether the instruction is to be executed in its entirety by the processor core 202A/202B or whether it is to be executed by heterogeneous functional unit 204. According to one embodiment, as part of the definition of the instruction (i.e., the instruction set architecture), it is a priori determined if the instruction is executed by processor core 202A/202B or heterogeneous functional unit 204. If determined in block 33 that the instruction is to be executed by the processor core 202A/202B, operation advances to block 34 where the processor core 202A/202B accesses data (by referencing its physical address 210) for processing the instruction via a cache-access path. If, on the other hand, it is determined in block 33 that the instruction is to be executed by the heterogeneous functional unit 204, operation advances to block 35 (of FIG. 3B) where the processor core 202A/202B communicates the instruction to the heterogeneous functional unit 204, and then in block 36 the heterogeneous functions unit accesses data for processing the instruction via the direct-access path. Exemplary operations that may be performed in each of the cache-access path 34 and the direct-access path 36 in certain embodiments are described further below.

In certain embodiments, the determination in block 33 may be made based, at least in part, on the instruction that is fetched. For instance, in certain embodiments, the heterogeneous functional unit 204 contains some operational instructions (in its instruction set) that are part of the native instruction set of the processor cores 202A/202B. For instance, in certain embodiments, the x86 (or other) instruction set may be modified to include certain instructions that are common to both the processor core(s) and the heterogeneous functional unit. For instance, certain operational instructions may be included in the native instruction set of the processor core(s) for off-loading instructions to the heterogeneous functional unit.

For example, in one embodiment, the instructions of an application being executed are decoded by the processor core(s) 202A/202B, wherein the processor core may fetch (in operational block 31) a native instruction (e.g., X86 instruction) that is called, as an example, "Heterogeneous Instruction 1". The decode logic of the processor core decodes the instruction in block 32 and determines in block 33 that this is an instruction to be off-loaded to the heterogeneous functional unit 204, and thus in response to decoding the Heterogeneous Instruction 1, the processor core initiates a control sequence (via control line 209) to the heterogeneous functional unit 204 to communicate (in operational block 35) the instruction to the heterogeneous functional unit 204 for processing.

In one embodiment, the cache-path access 34 includes the processor core 202A/202B querying, in block 301, the cache 203 for the physical address to determine if the referenced data (e.g., operand) is encached. In block 302, the processor core 202A/202B determines whether the referenced data is encached in cache 203. If it is encached, then operation advances to block 304 where the processor core 202A/202B retrieves the referenced data from cache 203. If determined in block 302 that the referenced data is not encached, operation advances to block 303 where a cache block fetch from main memory 201 is performed to load a fixed-size block of data, including the referenced data, into cache 203, and then operation advances to block 304 where the processor core retrieves the fetched data from cache 203.

In one embodiment, the direct-access path 36 (of FIG. 3B) includes the heterogeneous functional unit 204 interrogating (via path 205 of FIG. 2), in block 305, cache 203 to determine whether the referenced data has been previously encached. For instance, all memory references by heterogeneous functional unit 204 may use address path (bus) 205 of FIG. 2 to reference physical main memory 201. Data is loaded or stored via bus 206 of FIG. 2. Control path 209 of FIG. 2 is used to initiate control and pass data from processor core 202A/202B to heterogeneous functional unit 204.

In block 306, heterogeneous functional unit 204 determines whether the referenced data has been previously encached in cache 203. If it has not, operation advances to block 310 where the heterogeneous functional unit 204 retrieves the referenced data of the individually-referenced physical address (e.g., physical address 210 and 207 of FIG. 2) from main memory 201. That is, the referenced data is received, via path 206, from the individual-referenced physical address of main memory, rather than receiving a fixed-size block of data (such as a cache block), as is returned from main memory 201 in the cache-path access 34.

If determined in block 306 that the referenced data has been previously cached, then in certain embodiments different actions may be performed depending on the type of caching employed in the system. For instance, in block 307, a determination may be made as to whether the cache is a write-back caching technique or a write-through caching technique, each of which are well-known caching techniques in the art and are thus not described further herein. If a write-back caching technique is employed, then the heterogeneous functional unit 204 writes the cache block of cache 203 that contains the referenced data back to main memory 201, in operational block 308. If a write-through caching technique is employed, then the heterogeneous functional unit 204 invalidates the referenced data in cache 203, in operational block 309. In either case, operation then advances to block 310 to retrieve the referenced data of the individually-referenced physical address (e.g., physical address 210 and 207 of FIG. 2) from main memory 201, as discussed above.

In certain embodiments, if a hit is achieved from the cache in the direct-access path 36 (e.g., as determined in block 306), then the request may be completed from the cache 203, rather than requiring the entire data block to be written back to main memory 201 (as in block 308) and then referencing the single operand from main memory 201 (as in block 310). That is, in certain embodiments, if a hit is achieved for the cache 203, then the memory access request (e.g., store or load) may be satisfied by cache 203 for the heterogeneous functional unit 204, and if a miss occurs for cache 203, then the referenced data of the individually-referenced physical address (e.g., physical address 210 and 207 of FIG. 2) may be accessed in main memory 201, as discussed above (e.g., as in block 310). Thus, certain embodiments permit memory access of cache 203 by heterogeneous functional unit 204 (rather than bypassing the cache 203) when the memory access request can be satisfied by cache 203, but when the memory access request cannot be satisfied by cache 203 (i.e., a miss occurs), then an individually-referenced physical address (rather than a block-oriented access) is made of main memory 201.

For all traditional microprocessors of the prior art, main memory (e.g., 101 of FIG. 1) is block-oriented. Block-oriented means that even if one 64-bit word is referenced, 8 to 16 words ARE ALWAYS fetched and loaded into the microprocessor's cache (e.g., cache 103 of FIG. 1). As discussed above, this fixed-size block of 8 to 16 words are called the "cache block". For many applications, only one word of the 8 to 16 words of the cache block that are fetched is used. Consequently, a large amount (e.g., 87%) of the memory bandwidth is wasted (not used). This results in reduced application performance.

Typical of these types of applications are those that reference memory using a vector of indices. This is called "scatter/gather". For example, in the following FORTRAN code:

do i=1,n
a(i)=b(i)+c(i)
enddo all the elements of a, b, and c are sequentially referenced.

In the following FORTRAN code:

do i=1,n
a(j(i))=b(j(i))+c(j(i))
enddo a, b, and c are referenced through an index vector. Thus, the physical main memory system is referenced by non-sequential memory addresses.

According to certain embodiments, main memory 201 of system 200 comprises a memory dimm that is formed utilizing standard memory DRAMs, that provides full bandwidth memory accesses for non-sequential memory addresses. Thus, if the memory reference pattern is: 1, 20, 33, 55; then only memory words, 1, 20, 33, and 55 are fetched and stored. In fact, they are fetched and stored at the maximum rate permitted by the DRAMs.

In the above example, with the same memory reference pattern, a block-oriented memory system, with a block size of 8 words, would fetch 4 cache blocks to fetch 4 words:

{1 . . . 8}—for word 1;
{17 . . . 24}—for word 20;
{33 . . . 40}—for word 33; and
{51 . . . 56}—for word 55.

In the above-described embodiment of system 200 of FIG. 2, since full bandwidth is achieved for non-sequential memory accesses, full memory bandwidth is achieved for sequential accesses. Accordingly, embodiments of the present invention enable full bandwidth for memory accesses to be achieved for both non-sequential and sequential memory accesses.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A memory system providing memory access for a multiple processor system including at least one processor and at least one heterogeneous functional unit, the at least one processor configured to execute at least one instruction of a first instruction set and the at least one heterogeneous functional unit configured to execute at least one instruction of a second instruction set that is different than the first instruction set, the memory system comprising:
a main memory configured for individually-addressed data access;
a block oriented cache-access path coupling the main memory and a cache memory, wherein the block oriented cache-access path is configured to provide fixed-size data block access to the main memory, and wherein the cache memory provides storage of fixed-size data blocks of main memory data for data access by the at least one processor; and
an address oriented cache-bypass path coupling the main memory and the at least one heterogeneous functional unit, wherein the address oriented cache-bypass path provides individually-addressed data access to the main memory.

2. The memory system of claim 1, wherein the fixed-size data block access to the main memory returns data in addition to data referenced by a cache memory access by the at least one processor, and wherein the individually-addressed data access returns only data referenced by a physical address access by the at least one heterogeneous functional unit.

3. The memory system of claim 1, wherein the main memory is configured to emulate block data access for the block oriented cache-access path.

4. The memory system of claim 1, wherein the main memory comprises a scatter/gather memory module.

5. The memory system of claim 1, further comprising:
a cache interrogation path coupling the cache memory and the heterogeneous functional unit, wherein the cache interrogation path is configured to provide information regarding encached data to the heterogeneous functional unit in response to an interrogation by the heterogeneous functional unit regarding referenced data to be accessed by the heterogeneous functional unit.

6. The memory system of claim 5, wherein the cache interrogation path is configured initiate writing a cache block containing the referenced data to the main memory for individually-addressed data access of the referenced data from the main memory by the heterogeneous functional unit using the address oriented cache-bypass path.

7. The memory system of claim 5, wherein the cache interrogation path is configured to invalidate the referenced data in the cache memory in association with individually-addressed data access of the referenced data from the main memory by the heterogeneous functional unit using the address oriented cache-bypass path.

8. The memory system of claim 1, wherein the at least one processor and the at least one heterogeneous functional unit comprise different instruction sets.

9. A method comprising:
providing fixed-size data block access to a main memory by at least one processor of a multiple processor system including the at least one processor and at least one heterogeneous functional unit via a block oriented cache-access path coupling the main memory and a cache memory, the at least one processor configured to execute at least one instruction of a first instruction set and the at least one heterogeneous functional unit configured to execute at least one instruction of a second instruction set that is different than the first instruction set, wherein the cache memory provides storage of fixed-size data blocks of main memory data for data access by the at least one processor; and providing individually-addressed data access to the main memory by the at least one heterogeneous functional unit of the multiple processor system via an address oriented cache-bypass path coupling the main memory and the at least one heterogeneous functional unit.

10. The method of claim 9, wherein the fixed-size data block access to the main memory returns data in addition to data referenced by a cache memory access by the at least one processor, and wherein the individually-addressed data access returns only data referenced by a physical address access by the at least one heterogeneous functional unit.

11. The method of claim 9, wherein the main memory comprises scatter/gather memory configured for individually-addressed data access, and wherein the providing fixed-size data block access to the main memory comprises:
emulating block data access to the main memory for the block oriented cache-access path.

12. The method of claim 9, further comprising:
providing information regarding data encached in the cache memory to the heterogeneous functional unit in response to an interrogation by the heterogeneous functional unit regarding referenced data to be accessed by the heterogeneous functional unit.

13. The method of claim 12, further comprising:
writing a cache block containing the referenced data to the main memory for individually-addressed data access of the referenced data from the main memory by the heterogeneous functional unit.

14. The method of claim 12, further comprising:
invalidating the referenced data in the cache memory in association with individually-addressed data access of the referenced data from the main memory by the heterogeneous functional unit.

15. The method of claim 9, wherein the at least one processor and the at least one heterogeneous functional unit comprise different instruction sets.

16. The method of claim 9, further comprising:
off-loading an instruction from a processor of the at least one processor to a heterogeneous functional unit of the at least one heterogeneous functional unit so that the heterogeneous functional unit takes advantage of the address oriented cache-bypass path to access the main memory using the individually-addressed data access for processing the off-loaded instruction.

17. A system comprising:
at least one processor configured to execute at least one instruction of a first instruction set;
at least one heterogeneous functional unit configured to execute at least one instruction of a second instruction set that is different than the first instruction set;
a main memory configured for individually-addressed data access and for fixed-size data block access;
a cache memory configured to provide storage of fixed-size data blocks of main memory data for data access by the at least one processor;
a block oriented cache-access path coupling the main memory and the cache memory, wherein the block oriented cache-access path is configured to provide fixed-size data block access to the main memory; and
an address oriented cache-bypass path coupling the main memory and the at least one heterogeneous functional unit, wherein the address oriented cache-bypass path provides individually-addressed data access to the main memory.

18. The system of claim 17, further comprising:
a cache interrogation path coupling the cache memory and the heterogeneous functional unit, wherein the cache interrogation path is configured to provide information regarding encached data to the heterogeneous functional unit in response to an interrogation by the heterogeneous functional unit regarding referenced data to be accessed by the heterogeneous functional unit.

19. The system of claim 18, wherein the cache interrogation path is configured initiate writing a cache block containing the referenced data to the main memory for individually-addressed data access of the referenced data from the main memory by the heterogeneous functional unit using the address oriented cache-bypass path.

20. The system of claim 18, wherein the cache interrogation path is configured to invalidate the referenced data in the cache memory in association with individually-addressed data access of the referenced data from the main memory by the heterogeneous functional unit using the address oriented cache-bypass path.

* * * * *